United States Patent

[11] 3,569,623

[72] Inventor John P. Schnitzius
Cherry Hill, N.J.

[21] Appl. No. 778,677
[22] Filed Nov. 25, 1968
[45] Patented Mar. 9, 1971
[73] Assignee Ultronic Systems Corporation

[54] ELECTRONIC SIGNAL CONVERTER
2 Claims, 2 Drawing Figs.

[52] U.S. Cl. .......... 178/17, 179/2
[51] Int. Cl. .......... H04l 15/24
[50] Field of Search .......... 178/17, 70; 321/15 (Inquired), (AU), 212; 179/2DP, 2, 3, 4(Inquired)

[56] References Cited
UNITED STATES PATENTS
3,370,124 2/1968 Winter .......... 178/70

*Primary Examiner*—Kathleen H. Claffy
*Assistant Examiner*—Tom D'Amico
*Attorneys*—Norman J. O'Malley and Theodore C. Jay, Jr.

ABSTRACT: Apparatus for transforming standard polar or bipolar teletypelike signals as received from a telephone line into corresponding signals at different power levels for use with electronic equipment. In the apparatus, the received signals actuate and deactuate a tunnel diode oscillator. Oscillations thus produced are amplified, detected, integrated and thereafter processed to produce corresponding output signals at the desired power level.

INVENTOR
JOHN P. SCHNITZIUS
BY Theodore Jay Jr.
ATTORNEY

PATENTED MAR 9 1971 3,569,623

INVENTOR
JOHN P. SCHNITZIUS
BY
Theodore Jay Jr.
ATTORNEY

ELECTRONIC SIGNAL CONVERTER

BACKGROUND OF THE INVENTION

In many information handling systems, polar or bipolar teletypelike signals must be transferred from a telephone line to electronic equipment utilizing integrated circuits. The electrical characteristics of the line and circuits are so dissimilar that the power level of the signals from the line must be changed prior to being supplied to the equipment in order for the system to function properly. It is conventional to use electromechanical devices such as relays for this purpose. I have devised a new type of device (which I call an electronic signal converter) which can be substituted for relays and the like. My device provides complete isolation between the line and the equipment. Moreover, my device is much less expensive and is characterized by an inherently long operating life. Since it has no moving parts, it requires little or no servicing. It is adapted to handle data at speeds in excess of that obtainable with electromechanical devices. Finally, unlike the conventional relay which represents an inductive load, my device acts as a purely resistive load, thereby minimizing certain types of impedance mismatching and the like.

SUMMARY OF THE INVENTION

The polar or bipolar teletypelike signals are binary in type, and thus are characterized by two mutually exclusive states or levels. These signals are supplied serially to a tunnel diode oscillator so designed that the oscillator produces a first pulse train of equidistantly spaced pulses of like amplitude and duration each time the incoming signal attains one selected state and is quiescent when the incoming signal attains the other state. The output of the oscillator is amplified, detected and integrated to produce an intermediate signal having a first level when the received signal is in one selected state and having a second level when the received signal is in the other state. The intermediate signal is supplied to a comparator which produces an output pulse whenever the intermediate signal equals or exceeds a selected level and is quiescent when the intermediate signal falls below the selected level. The signals yielded at the output of the comparator exhibit the proper electrical characteristics for use with integrated circuitry.

DETAILED DESCRIPTION OF PREFERRED EMBODIMENTS

Figure 1:
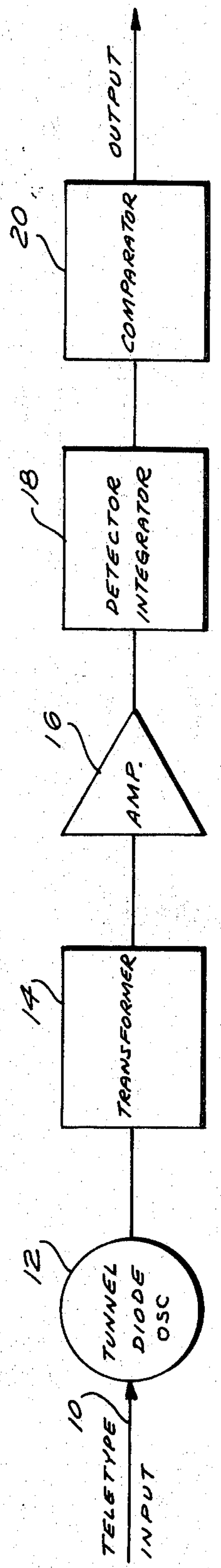
FIG. 1 is a block diagram of my invention.

Referring now to FIG. 1, the output of the telephone line 10 is connected to the input of a tunnel diode oscillator 12. The output of this oscillator is coupled to the primary winding of pulse transformer 14. The secondary winding of the transformer is connected to the input of an amplifier 16. The output of amplifier 16 is connected to a peak detector and integrator circuit 18. The output of this circuit is fed to a comparator or slicer 20. Signals obtained at the output of converter 20 are supplied to integrated circuitry for further use.

Figure 3:
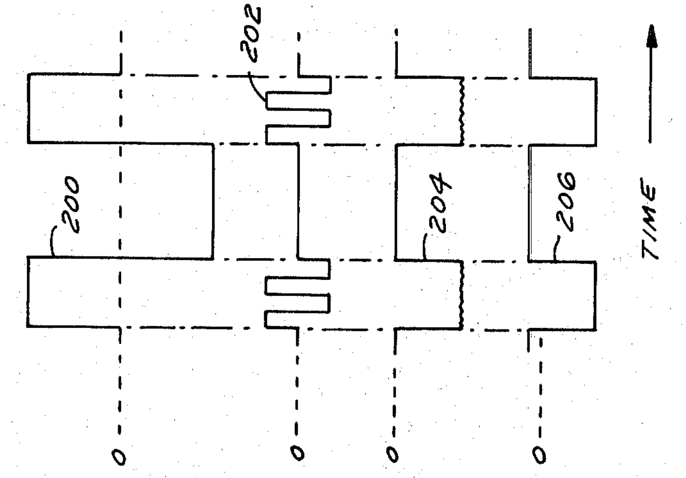
FIG. 3 is a graph of certain waveforms which are employed in my invention.

As shown in FIG. 3, the signal on the telephone line can typically be a bipolar binary signal as shown at 200. Whenever the signal 200 goes positive, the tunnel diode oscillates at a frequency perhaps two orders of magnitude higher than that of the signal and produces across the secondary of the pulse transformer a pulse train of rectangular current pulses of like amplitude and frequency as shown at 202. Whenever signal 200 goes negative, these oscillations cease.

The pulse train, after amplification, passes through a peak detector which yields current spikes which in turn are then integrated to produce polar signals 204. These signals then are supplied to the slicer, which produces a negative output pulse 206 whenever the amplitude of signals 204 equal or exceed a selected negative value, and which remains otherwise at a fixed positive value.

Figure 2:
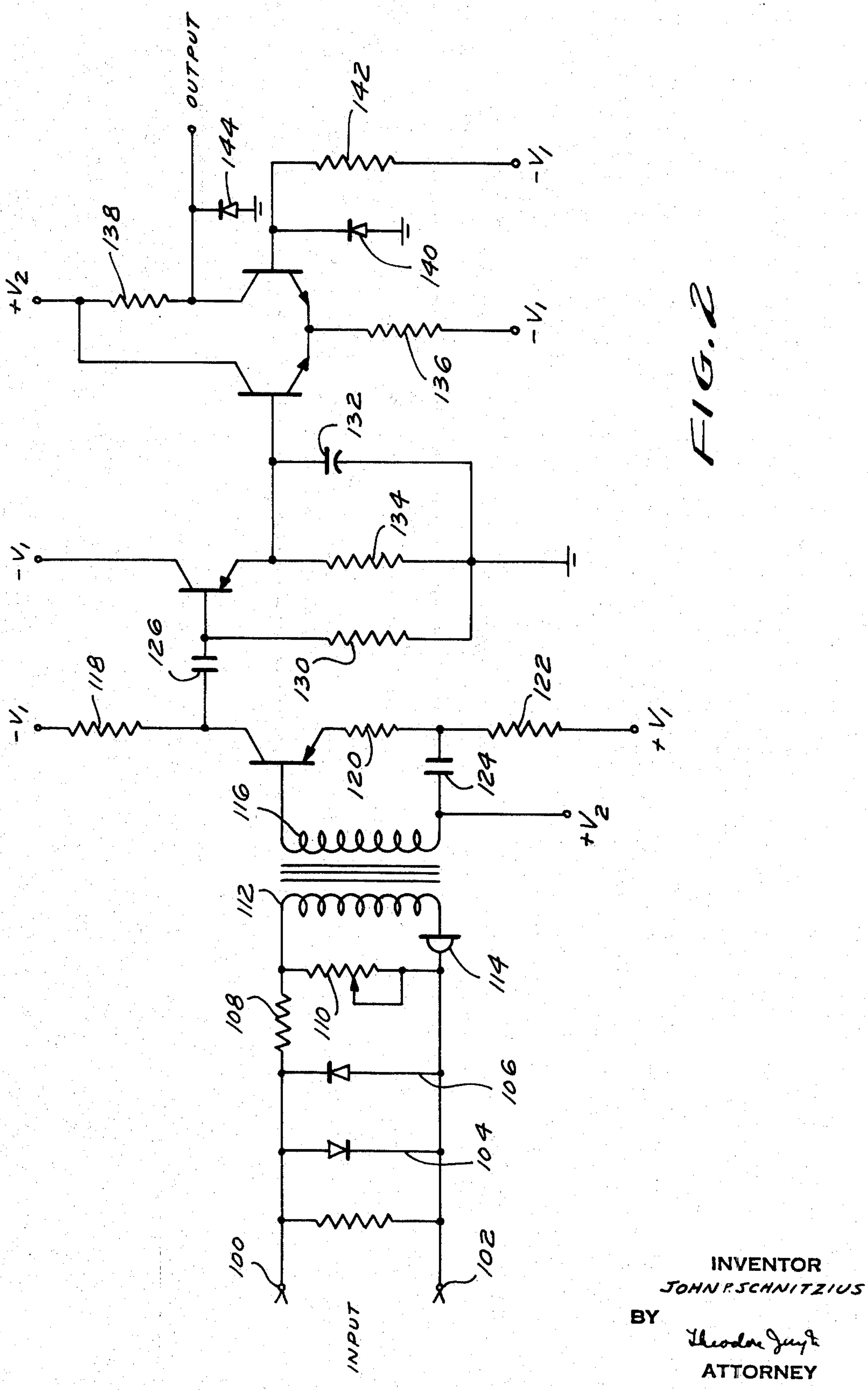
FIG. 2 is a circuit diagram of my invention.

Referring now to FIG. 2, the two conductors of the telephone line terminate at points 100 and 102 respectively. These points are shunted by either a single diode 104 (when polar signals are used) or by parallel diodes 104 and 106 (when bipolar signals are used). In the later case, the diodes are poled in opposite sense. The diodes are shunted by resistor 108 and rheostat 110 in series connection. The rheostat is shunted by the primary winding 112 of pulse transformer 14 in series connection with a tunnel diode 114. The secondary winding 116 of pulse transformer 14 is connected between a point of positive potential and the base of transistor Q1. The collector of transistor Q1 is connected through resistor 118 to a point of negative potential. The emitter of transistor Q1 is connected through two resistors 120 and 122 in series to a point of positive potential and the junction of these resistors is connected through capacitor 124 to the first point of positive potential. The collector of transistor Q1 is connected through capacitor 126 t—o the base of transistor Q2. The junction of capacitor 126 and the base of transistor Q2 is grounded through resistor 130. The emitter of transistor Q2 is grounded through a parallel network consisting of capacitor 132 shunted by resistor 134. The collector of transistor Q2 is connected to a point of negative potential.

The emitter of transistor Q2 is connected to the base of transistor Q3. The emitters of transistors Q3 and Q4 are connected together through a common resistor 136 to a point of negative potential. The collector of transistor Q3 is connected to a point of positive potential and the collector of transistor Q4 is connected to this same point through resistor 138. The base of transistor Q4 is grounded via diode 140 and is also connected through resistor 142 to a point of negative potential. The collector of transistor Q4 is grounded through diode 144. The output signals yielded by my device appears across diode 144.

The diode 104 of diodes 104 and 106 maintain the voltage drop across the line 10 at a level of one or two volts to insure proper operating voltage for the tunnel diode. When signal 200 goes positive, (typically a polar signal swings between plus and minus 30 milliamperes), the tunnel diode oscillates at a frequency determined by the sum of the individual resistances of resistor 108 and rheostat 110 and the internal resistance of the tunnel diode as well as the voltage applied across the tunnel diode and the primary of the pulse transformer. When the signal 200 swings negative, the diode does not oscillate.

The oscillations are amplified by transistor Q1 and thereafter are detected by transistor Q2 and integrated by the capacitor-resistor network 132 and 134.

The integrated signals are supplied to the base of transistor Q3. When these signals attain a value equal to or exceeding the fixed potential at the base of transistor Q4, a positive pulse appears across diode 144. When the integrated signal falls below this value, no pulse is produced.

While I described my invention with particular reference to preferred embodiments, my protection is to be limited only by the claims which follow.

I claim:

1. An electronic signal converter responsive to polar or bipolar teletypelike signals yielded in bit-series form across the two spaced conductors of a telephone line to transform said signals to corresponding signals at different power levels, said signals being characterized by two mutually exclusive states, said converter comprising:

rectifier means connected across said conductors to maintain a voltage drop thereacross in the approximate range of 1 to 2 volts, said means being a single rectifier when polar signals are employed and being two oppositely poled parallel rectifiers when bipolar signals are employed;

a tunnel diode oscillator coupled at its input to said rectifier means connected conductors to produce a pulse train of equidistantly spaced pulses of like amplitude and duration each time said signals attain one selected state, said oscillator remaining quiescent when said signals attain the other state;

second means coupled to the output of said oscillator and responsive to said pulse train to detect same;

an integrator coupled to the second means and responsive to the detected train to integrate same and produce intermediate polar signals; and a comparator coupled to the output of the integrator and responsive to the intermediate polar signals to produce an output pulse whenever the intermediate signals attain at least a selected level, said comparator being quiescent when the intermediate signals fall below said level.

2. A converter as set forth in claim 1 wherein said second means includes an amplifier and a peak detector.